US008418798B2

(12) United States Patent
Mori et al.

(10) Patent No.: US 8,418,798 B2
(45) Date of Patent: Apr. 16, 2013

(54) INDUSTRIAL VEHICLE

(75) Inventors: Takuya Mori, Komatsu (JP); Hirotaka Takahashi, Komatsu (JP); Toru Shiina, Komatsu (JP); Masanori Ikari, Sayama (JP); Atsushi Shirao, Komatsu (JP)

(73) Assignee: Komatsu Ltd., Tokyo (JP)

(*) Notice: Subject to any disclaimer, the term of this patent is extended or adjusted under 35 U.S.C. 154(b) by 0 days.

(21) Appl. No.: 13/392,018

(22) PCT Filed: Sep. 1, 2010

(86) PCT No.: PCT/JP2010/064875
§ 371 (c)(1),
(2), (4) Date: Feb. 23, 2012

(87) PCT Pub. No.: WO2011/027758
PCT Pub. Date: Mar. 10, 2011

(65) Prior Publication Data
US 2012/0152640 A1 Jun. 21, 2012

(30) Foreign Application Priority Data
Sep. 3, 2009 (JP) ................................. 2009-204035

(51) Int. Cl.
*B60K 6/08* (2006.01)
*F16H 61/42* (2010.01)
*E02F 9/22* (2006.01)

(52) U.S. Cl.
USPC ................................ 180/307; 60/445; 701/50

(58) Field of Classification Search .................. 180/305, 180/306, 307; 60/431, 445, 490, 428; 701/50
See application file for complete search history.

(56) References Cited

U.S. PATENT DOCUMENTS

| | | | | |
|---|---|---|---|---|
| 3,932,993 A | * | 1/1976 | Riedhammer | 60/431 |
| 4,354,420 A | * | 10/1982 | Bianchetta | 91/6 |
| 5,299,421 A | | 4/1994 | Ikari | |
| 5,638,677 A | * | 6/1997 | Hosono et al. | 60/431 |
| 5,709,282 A | | 1/1998 | Akira et al. | |
| 5,784,883 A | * | 7/1998 | Ohkura et al. | 60/327 |
| 6,371,885 B1 | * | 4/2002 | Kobayashi et al. | 477/115 |
| 7,454,282 B2 | * | 11/2008 | Mizuguchi | 701/102 |
| 7,524,268 B2 | * | 4/2009 | Oka et al. | 477/169 |
| 7,686,737 B2 | * | 3/2010 | Nishi et al. | 477/115 |
| 7,962,768 B2 | * | 6/2011 | Grill et al. | 713/300 |
| 8,082,082 B2 | * | 12/2011 | Matsuyama | 701/50 |
| 8,167,154 B2 | * | 5/2012 | Heidrich et al. | 212/289 |
| 8,176,734 B2 | * | 5/2012 | Throckmorton | 60/452 |
| 2009/0320462 A1 | * | 12/2009 | Ohtsukasa | 60/431 |

FOREIGN PATENT DOCUMENTS

| | | |
|---|---|---|
| JP | 2005-201300 A | 7/2005 |
| JP | 2008-180274 A | 8/2008 |
| JP | 2008-275012 A | 11/2008 |

OTHER PUBLICATIONS

International Search Report of corresponding PCT Application No. PCT/JP2010/064875.
Office Action issued on Dec. 21, 2012 by Swedish Patent Authority in corresponding Swedish Application No. 1250173-0.

* cited by examiner

*Primary Examiner* — John Walters
*Assistant Examiner* — James Triggs
(74) *Attorney, Agent, or Firm* — Global IP Counselors

(57) ABSTRACT

In a work vehicle, a controller controls the displacement of a hydraulic motor by electronically controlling a motor displacement control part. When an inching operation member is being operated, the controller performs inching control for setting the minimum displacement of the hydraulic motor to a greater value in correspondence with a lower pilot pressure detected by a pilot pressure detector.

4 Claims, 8 Drawing Sheets

INDUSTRIAL VEHICLE

CROSS-REFERENCE TO RELATED APPLICATIONS

This application claims priority to Japanese Patent Application No. 2009-204035 filed on Sep. 3, 2009, the disclosure of which is hereby incorporated herein by reference in its entirety.

TECHNICAL FIELD

The present invention relates to a work vehicle.

BACKGROUND ART

In a work vehicle equipped with a so-called hydrostatic transmission (HST) circuit, a hydraulic pump is driven by an engine, and hydraulic fluid discharged from the hydraulic pump is supplied to a hydraulic motor. A drive wheel is then driven by the hydraulic motor, propelling the vehicle forward. Some such work vehicles are equipped with an inching operation part. For example, in a work vehicle disclosed in Japanese Laid-Open Patent Application Publication No. 2001-27319, depressing an inching pedal opens an inching valve, whereby the discharge of hydraulic fluid by a hydraulic pump is reduced. Through this, the rotation rate of the hydraulic motor decreases, and the vehicle can be decelerated. This inching operation is performed when, for example, the vehicle is to be made to decelerate while maintaining high engine rotation rate so as not to reduce work machine output.

Among work vehicles provided with an HST circuit, there are work vehicles wherein the displacement of the hydraulic motor is electronically controlled, as described in Japanese Laid-Open Patent Application Publication No. 2008-275012. Such work vehicles have a motor control valve that is an electromagnetic control valve, and, the displacement of the hydraulic motor is controlled by a command signal input from a controller to the motor control valve. Thus, in such work vehicles, it is possible to control the displacement of the hydraulic motor as desired by electronically controlling the motor control valve.

SUMMARY

In work vehicles such as those described above, in which hydraulic motor displacement is electronically controlled, inching as described above is made possible by providing an inching valve that reduces the pilot pressure supplied to a pump displacement control cylinder. In other words, the pilot pressure supplied to the pump displacement control cylinder is reduced by the inching valve, and the pump displacement control cylinder is driven so that pump displacement is reduced. It is thereby possible to generate braking force in the vehicle. However, because little braking force is generated by reducing hydraulic pump displacement, such a method is insufficient when a larger braking force is required.

An object of the present invention lies in providing a work vehicle in which a large braking force can be generated via the inching operation.

A work vehicle according to a first aspect of the present invention has an engine, a hydraulic pump, a pump displacement control part, a pilot pressure supply part, a hydraulic motor, a drive wheel, a motor displacement control part, an inching operation member, a pilot pressure detector, and a controller. The hydraulic pump is a variable displacement pump driven by the engine. The pump displacement control part controls hydraulic pump displacement according to a supplied pilot pressure. The pilot pressure supply part supplies pilot pressure to the pump displacement control part according to the engine rotation rate. The hydraulic motor is a variable displacement motor driven by hydraulic fluid discharged by the hydraulic pump. The drive wheel is driven by the hydraulic motor. The motor displacement control part controls the displacement of the hydraulic motor. The inching operation member is configured to be operated for reducing the pilot pressure supplied to the pump displacement control part. The pilot pressure detector detects the pilot pressure supplied to the pump displacement control part. The controller is configured to control the displacement of the hydraulic motor by electronically controlling the motor displacement control part. When the inching operation member is being operated, the controller is configured to perform inching control so that minimum displacement of the hydraulic motor is set at a greater value in correspondence with a lower pilot pressure detected by the pilot pressure detector.

A work vehicle according to a second aspect of the present invention is a work vehicle according to the first aspect further provided with an engine rotation rate detector for detecting engine rotation rate. The controller is configured to calculate pilot pressure corresponding to the engine rotation rate detected by the engine rotation rate detector. When the pilot pressure detected by the pilot pressure detector is smaller than the calculated pilot pressure, the controller is configured to determine that the inching operation member is being operated.

A work vehicle according to a third aspect of the present invention is a work vehicle according to the first aspect wherein the controller is configured to perform traction control for reducing vehicle traction force by reducing the maximum displacement of the hydraulic motor. When the minimum displacement of the hydraulic motor during the inching control is greater than the maximum displacement of the hydraulic motor during the traction control, the controller is configured not to perform the inching control.

A work vehicle according to a fourth aspect of the present invention is a work vehicle according to any of the first through the third aspects, wherein the controller is configured to control the motor displacement control part so as to gradually change the displacement of the hydraulic motor when the displacement of the hydraulic motor is changed upon the start or end of the inching control.

In the work vehicle according to the first aspect, when the inching operation member is operated, the pilot pressure supplied to the pump displacement control part decreases. The displacement of the hydraulic pump is thereby decreased. Also, when the inching operation member is operated, inching control is performed. During the inching control, the minimum displacement of the hydraulic motor is set to a greater value in correspondence with a smaller pilot pressure being supplied to the pump displacement control part. Thus, the minimum displacement of the hydraulic motor is set to a greater value than when the inching operation member is not being operated. When the displacement of the hydraulic motor is large, the braking force generated by an HST brake increases. Thus, by controlling not only the hydraulic pump but also the hydraulic motor via inching operation, a braking force greater than that yielded when only the displacement of the hydraulic pump is reduced can be generated.

In the work vehicle according to the second aspect, when the inching operation member is operated, the pilot pressure supplied to the pump displacement control part is reduced. The actual pilot pressure thereby becomes less than the calculated value of the pilot pressure corresponding to the engine rotation rate. Thus, in this work vehicle, it is possible to ascertain with accuracy that the inching operation member is being operated by performing the determination described above.

In the work vehicle according to the third aspect, maximum displacement decreases when the traction control is performed, but the inching control is not performed when the minimum displacement of the hydraulic motor during inching control is greater than the maximum displacement of the hydraulic motor during traction control. It is thereby possible to prevent minimum displacement from being set to a greater value than maximum displacement.

In the work vehicle according to the fourth aspect, it is possible to prevent abrupt changes in the displacement of the hydraulic motor when starting or ending inching control. It is thereby possible to prevent shocks from being generated in the vehicle.

DETAILED DESCRIPTION OF THE PREFERRED EMBODIMENTS

Overall Configuration

Figure 1:
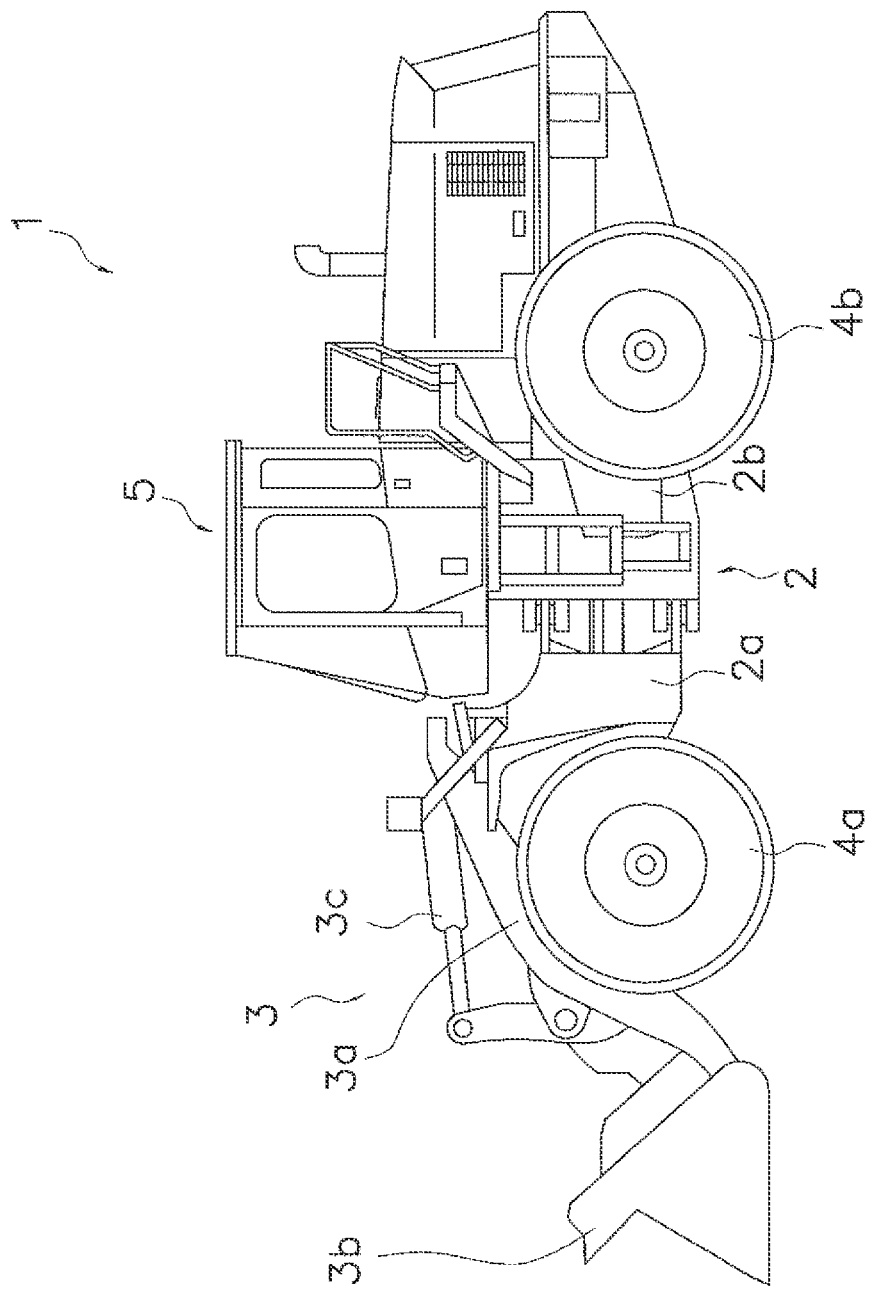
FIG. 1 is a side view of a work vehicle.

FIG. 1 is a side view of a construction vehicle 1 according to a first embodiment of the present invention. This construction vehicle 1 is a wheel loader that is capable of self-propulsion by tires 4a and 4b and can perform a desired type of work using a work machine 3. The construction vehicle 1 is provided with a body frame 2, a work machine 3, tires 4a and 4b, and an operator cab 5.

The body frame 2 has a front frame 2a frontwardly disposed and a rear frame 2b rearwardly disposed, and the front frame 2a and the rear frame 2b are connected with a central part of the body frame 2 so as to be capable of swinging in the lateral direction.

Figure 2:
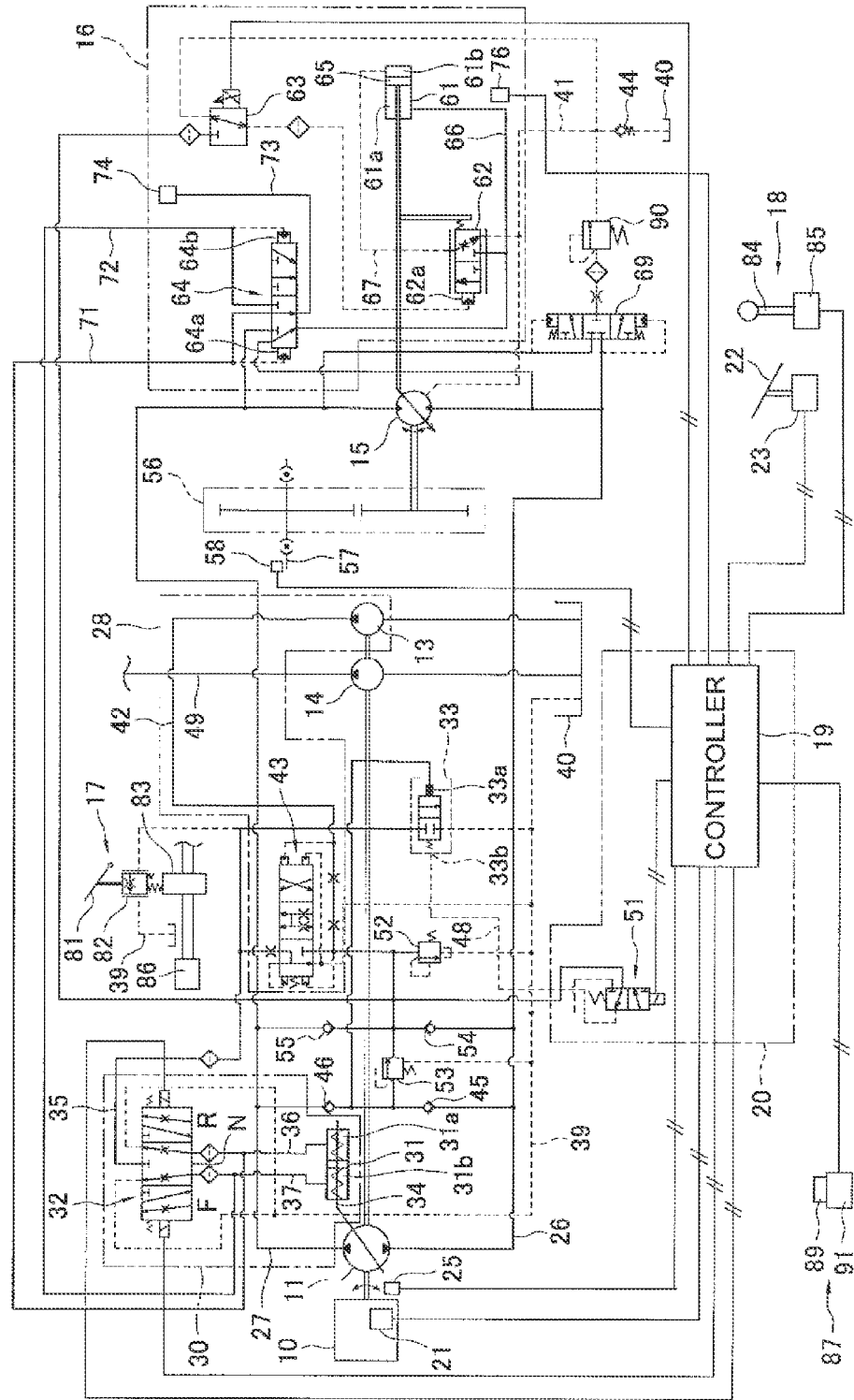
FIG. 2 illustrates the configuration of a hydraulic drive mechanism of a work vehicle.

The work machine 3 and a pair of front tires 4a are attached to the front frame 2a. The work machine 3 is an apparatus driven by hydraulic fluid pumped by a second hydraulic pump 14 (see FIG. 2), and has a lift arm 3a mounted to a front part of the front frame 2a, a basket 3b attached to an end of the lift arm 3a, a lift cylinder (not illustrated) that drives the lift arm 3a, and a tilt cylinder 3c that drives the basket 3b. The pair of front tires 4a is provided on side surfaces of the front frame 2a.

The operator cab 5, a pair of rear tires 4b, and the like are provided on the rear frame 2b. The operator cab 5 is mounted on an upper part of the body frame 2, and is furnished in its interior with operating parts such as a steering wheel, an accelerator pedal, and the like; a display part that displays various types of information such as vehicle speed; a seat; and the like. The pair of rear tires 4b is provided on side surfaces of the rear frame 2b.

Also a hydraulic drive mechanism for driving the tires 4a and 4b as drive wheels and the work machine 3 is mounted on the body frame 2. The structure of the hydraulic drive mechanism will be explained below with reference to FIG. 2.

Hydraulic Drive Mechanism

The hydraulic drive mechanism primarily has an engine 10, a first hydraulic pump 11 for travelling, a pump displacement control part 30, a pilot pressure supply part 28, a cut-off valve 33, a second hydraulic pump 14 for the work machine, a hydraulic motor 15 for travelling, a motor displacement control part 16, an inching operation part 17, a forward/backward switching operation part 18, a controller 19, and the like. In the hydraulic drive mechanism, a closed HST circuit is composed by the first hydraulic pump 11 and the hydraulic motor 15.

The engine 10 is a diesel engine, and output torque generated by the engine 10 is conveyed to the first hydraulic pump 11, the charge pump 13, and the second hydraulic pump 14. A fuel injector device 21 that controls the output torque and the rotation rate of the engine 10 is attached to the engine 10. The fuel injector device 21 adjusts a rotation rate command value of the engine 10 according to the amount by which an accelerator pedal 22 is operated (hereafter "accelerator operation amount"), adjusting the amount of fuel injected. The accelerator pedal 22 constitutes means for indicating the target rotation rate for the engine 10, and is provided with an accelerator operation amount detector 23. The accelerator operation amount detector 23 includes a potentiometer or the like, and detects the accelerator operation amount. The accelerator operation amount detector 23 sends an opening angle signal indicating accelerator operation amount to the controller 19, and a command signal is outputted from the controller 19 to the fuel injector device 21. The operator is thereby able to control the rotation rate of the engine 10 by adjusting the operation amount of the accelerator pedal 22. The engine 10 is also provided with an engine-rotation-rate detector 25. The engine-rotation-rate detector 25 is composed of a rotational sensor that detects the actual rotation rate of the engine 10. A detection signal indicating the rotation rate of the engine 10 is input from the engine-rotation-rate detector 25 to the controller 19.

The first hydraulic pump 11 is a variable displacement hydraulic pump whose displacement can be altered by modifying the angle of a swashplate, and is driven by the engine 10. Hydraulic fluid pumped out of the first hydraulic pump 11 is sent to the hydraulic motor 15 via drive circuits 26 and 27. The drive circuit 26 is a conduit (hereafter, "forward drive circuit 26") that supplies hydraulic fluid to the hydraulic motor 15 so as to drive the hydraulic motor 15 in a direction such that the vehicle will advance. The drive circuit 27 is a conduit (hereafter, "backward drive circuit 27") that supplies hydraulic fluid to the hydraulic motor 15 so as to drive the hydraulic motor 15 in a direction such that the vehicle will move in reverse.

The pump displacement control part 30 controls the displacement of the first hydraulic pump 11 by changing the angle of the swashplate of the first hydraulic pump 11. The pump displacement control part 30 controls the displacement of the first hydraulic pump 11 according to the pilot pressure of the hydraulic fluid supplied via a main pilot circuit 35 described below (hereafter, "main pilot circuit pressure").

The pump displacement control part 30 has a pump displacement control cylinder 31 and an electromagnetic direction control valve 32.

The pump displacement control cylinder 31 actuates a piston 34 according to the pressure supplied by the hydraulic fluid. The pump displacement control cylinder 31 has a first fluid sump 31a and a second fluid sump 31b, and the position of the piston 34 is modified according to the balance between the hydraulic pressure within the first fluid sump 31a and the hydraulic pressure within the second fluid sump 31b. The piston 34 is connected to the swashplate of the first hydraulic pump 11, and the angle of the swashplate is modified by the movement of the piston 34.

The electromagnetic direction control valve 32 is an electromagnetic control valve that controls the pump displacement control cylinder 31 based on a command signal from the controller 19. The electromagnetic direction control valve 32 is capable of controlling the direction in which hydraulic fluid is supplied to the pump displacement control cylinder 31 based on a command signal from the controller 19. Thus, by electronically controlling the electromagnetic direction control valve 32, the controller 19 can alter the direction in which hydraulic fluid is pumped out of the first hydraulic pump 11. The electromagnetic direction control valve 32 switches between a forward drive mode F, a backward drive mode R, and a neutral mode N.

When in forward drive mode F, the electromagnetic direction control valve 32 connects a first pilot circuit 36 and a main pilot circuit 35 described below, and connects a second pilot circuit 37 and a drainage circuit 39. The drainage circuit 39 is connected to a tank 40. The first pilot circuit 36 is connected to the first fluid sump 31a of the pump displacement control cylinder 31. The second pilot circuit 37 is connected to the second fluid sump 31b of the pump displacement control cylinder 31. Because of this, when the electromagnetic direction control valve 32 is in the forward drive mode F, hydraulic fluid is supplied to the first fluid sump 31a via the main pilot circuit 35 and the first pilot circuit 36, and hydraulic fluid is discharged from the second fluid sump 31b. Through this, the swashplate angle of the first hydraulic pump 11 is changed to a direction such that displacement towards the forward drive circuit 26 increases.

When the electromagnetic direction control valve 32 is in the backward drive mode R, the electromagnetic direction control valve 32 connects the second pilot circuit 37 and the main pilot circuit 35, and connects the first pilot circuit 36 and the drainage circuit 39. Because of this, when the electromagnetic direction control valve 32 is in the backward drive mode R, hydraulic fluid is supplied to the second fluid sump 31b via the main pilot circuit 35 and the second pilot circuit 37. Through this, the swashplate angle of the first hydraulic pump 11 is changed to a direction such that displacement towards the backward drive circuit 27 increases. When the electromagnetic direction control valve 32 is in the neutral mode N, both the first pilot circuit 36 and the second pilot circuit 37 are connected to the drainage circuit 39.

The pilot pressure supply part 28 supplies pilot pressure to the pump displacement control part 30 according to engine rotation rate. The pilot pressure supply part 28 has a charge pump 13 and an engine sensing valve 43.

The charge pump 13 is driven by the engine 10, and is a fixed displacement pump that discharges hydraulic fluid. The hydraulic fluid discharged by the charge pump 13 is supplied to the electromagnetic direction control valve 32 via a charge circuit 42, an engine sensing valve 43, and the main pilot circuit 35. The charge pump 13 supplies hydraulic fluid to the electromagnetic direction control valve 32 in order to actuate the pump displacement control cylinder 31. Specifically, the charge pump 13 supplies the main pilot circuit pressure to the pump displacement control part 30.

The engine sensing valve 43 converts hydraulic pressure from the charge pump 13 into hydraulic pressure according to the engine rotation rate. Thus, the engine sensing valve 43 changes the pressure of the main pilot circuit 35 according to the engine rotation rate. Specifically, when the engine rotation rate increases, the engine sensing valve 43 increases the pressure of the main pilot circuit 35. Alterations in the pressure of the main pilot circuit 35 by the engine sensing valve 43 increase and decrease the displacement of the first hydraulic pump 11 described above.

The cut-off valve 33 is connected to main pilot circuit 35. A first pilot port 33a of the cut-off valve 33 is connected to the forward drive circuit 26 via a check valve 45, and to the backward drive circuit 27 via a check valve 46. A second pilot port 33b of the cut-off valve 33 is connected to the charge circuit 42 via a cut-off pilot circuit 48 and a cut-off pressure control valve 51 described below. The cut-off valve 33 is switched between an open state and a closed state according to the hydraulic pressure of drive circuits 26 and 27 (hereafter, "drive pressure"). The cut-off valve 33 thereby limits drive pressure so as not to surpass a set cut-off pressure value. Specifically, when drive pressure reaches or surpasses a set cut-off pressure value, the cut-off valve 33 connects the main pilot circuit 35 and the drainage circuit 39, and reduces the pressure of the main pilot circuit 35, i.e., the main pilot circuit pressure. When the main pilot circuit pressure is reduced, the pilot pressure being supplied to the pump displacement control cylinder 31 via the electromagnetic direction control valve 32 is reduced. As a result, the displacement of the first hydraulic pump 11 is reduced, and drive pressure is reduced. The displacement of the first hydraulic pump 11 is thereby controlled so that the drive pressure does not surpass a predetermined cut-off pressure value. The cut-off valve 33 is also capable of changing the cut-off pressure according to the pilot pressure supplied to the second pilot port 33b.

The cut-off pressure control valve 51 is an electromagnetic control valve electronically controlled by a command signal from the controller 19, and is switched between two levels, an excited state and an unexcited state. When in the excited state, the cut-off pressure control valve 51 connects the cut-off pilot circuit 48 and the drainage circuit 39. Hydraulic fluid is thereby expelled from the second pilot port 33b of the cut-off valve 33, and the cut-off pressure of the cut-off valve 33 is set at a predetermined low pressure value. When in the unexcited state, the cut-off pressure control valve 51 connects the charge circuit 42 and the cut-off pilot circuit 48. Hydraulic fluid is thereby supplied to the second pilot port 33b of the cut-off valve 33, and the cut-off pressure of the cut-off valve 33 is set at a predetermined high pressure value. In this way, the cut-off pressure control valve 51 is capable of controlling the pilot pressure supplied to the second pilot port 33b of the cut-off valve 33 according to a command signal input from the controller 19.

The charge circuit 42 is connected to the drainage circuit 39 via a first relief valve 52. The first relief valve 52 limits the hydraulic pressure of the charge circuit 42 so that it does not surpass a predetermined relief pressure. The charge circuit 42 is connected to drive circuits 26 and 27 via a second relief valve 53 and check valves 54 and 55. The second relief valve 53 connects the charge circuit 42 and the drive circuits 26 and 27 when the drive pressure reaches a predetermined relief pressure. The drive circuits 26 and 27 are thereby limited so as not to surpass the predetermined relief pressure.

The second hydraulic pump 14 is driven by the engine 10. Hydraulic fluid discharged from the second hydraulic pump 14 is sent to a tilt cylinder 3c (see FIG. 1) via a work machine circuit 49, driving the tilt cylinder 3c and other components.

The hydraulic motor 15 is a variable displacement hydraulic motor capable of altering displacement by altering the angle of an inclined shaft. The hydraulic motor 15 is driven by hydraulic fluid that is discharged from the first hydraulic pump 11 and supplied via the drive circuits 26 and 27. The hydraulic motor 15 thereby generates the driving force needed for travelling. By being supplied with hydraulic fluid via the forward drive circuit 26, the hydraulic motor 15 is driven in a direction corresponding to a forward movement of the vehicle. By being supplied with hydraulic fluid via the backward drive circuit 27, the hydraulic motor 15 is driven in a direction corresponding to a backward movement of the vehicle.

The driving force of the hydraulic motor 15 is conveyed to an output shaft 57 via a transfer 56, whereby the tires 4a and 4b rotate and the vehicle is propelled. The output shaft 57 is also provided with an output rotation rate detector 58. The output rotation rate detector 58 is composed of a rotational sensor that detects the rotation rate and rotational direction of the output shaft 57. The information detected by the output rotation rate detector 58 is sent to the controller 19 as a detection signal. Based on the rotation rate of the output shaft 57 detected by the output rotation rate detector 58, the controller 19 is able to determine whether the vehicle is moving forward or backward, or if it is parked. As such, the output rotation rate detector 58 functions as a forward/backward detector that detects whether the vehicle is moving forward or backward.

The motor displacement control part 16 controls the displacement of the hydraulic motor 15 (hereafter "motor displacement") by controlling the angle of incline of an inclined shaft of the hydraulic motor 15. The motor displacement control part 16 has a motor displacement control cylinder 61, a motor displacement control valve 62, a pilot pressure control valve 63, and a forward/backward switching valve 64.

The motor displacement control cylinder 61 actuates a piston 65 according to the pressure of the supplied hydraulic fluid. The motor displacement control cylinder 61 has a first fluid sump 61a and a second fluid sump 61b, and the position of the piston 65 is modified according to the balance between the hydraulic pressure within the first fluid sump 61a and the hydraulic pressure within the second fluid sump 61b. The piston 65 is connected to the inclined shaft of the hydraulic motor 15, and the angle of the inclined shaft is modified by the movement of the piston 65.

The motor displacement control valve 62 controls the motor displacement control cylinder 61 according to the pilot pressure being supplied. The motor displacement control valve 62 is switched between a first state and a second state according to the pilot pressure being supplied to pilot port 62a. In the first state, the motor displacement control valve 62 connects a first motor cylinder circuit 66 and a second motor cylinder circuit 67. The first motor cylinder circuit 66 is a circuit connecting the forward/backward switching valve 64 and the first fluid sump 61a of the motor displacement control cylinder 61. The second motor cylinder circuit 67 is a circuit connecting the motor displacement control valve 62 and the second fluid sump 61b of the motor displacement control cylinder 61. When the motor displacement control valve 62 is in the first state, hydraulic fluid is supplied to the second fluid sump 61b of the motor displacement control cylinder 61. The piston 65 of the motor displacement control cylinder 61 is thereby actuated so that motor displacement decreases. When the motor displacement control valve 62 is in the second state, the motor displacement control valve 62 connects the second motor cylinder circuit 67 and a drainage circuit 41. The drainage circuit 41 is connected to the tank 40 via a check valve 44. For this reason, hydraulic fluid is discharged from the second fluid sump 61b of the motor displacement control cylinder 61. The piston 65 of the motor displacement control cylinder 61 is thereby actuated so that motor displacement increases. As described above, the motor displacement control valve 62 controls the direction and amount of hydraulic fluid supplied to motor displacement control cylinder 61 according to the pilot pressure supplied to the pilot port 62a. The motor displacement control valve 62 is thereby capable of controlling motor displacement based on pilot pressure.

The pilot pressure control valve 63 is an electromagnetic proportional control valve that is electronically controlled by a command signal from the controller 19. The pilot pressure control valve 63 controls the supply and discharge of hydraulic fluid to and from the pilot port 62a of the motor displacement control valve 62. The pilot pressure control valve 63 supplies hydraulic fluid from the charge circuit 42 to the pilot port 62a. The pilot pressure control valve 63 also discharges hydraulic fluid from the pilot port 62a to the tank 40. The pilot pressure control valve 63 is capable of controlling hydraulic pressure being supplied to the pilot port 62a of the motor displacement control valve 62 as desired according to a command signal from the controller 19. Thus, by electrically controlling the pilot pressure control valve 63, the controller 19 can control the hydraulic fluid displacement of the hydraulic motor 15 as desired. A low pressure switch valve 69 connects whichever of drive circuits 26 and 27 has lower pressure to the tank 40 via a relief valve 90.

The forward/backward switching valve 64 supplies hydraulic fluid from whichever of drive circuits 26 and 27 has higher pressure to the motor displacement control cylinder 61. Specifically, when the electromagnetic direction control valve 32 is in the forward drive mode F, hydraulic fluid is supplied to a forward drive pilot port 64a of the forward/backward switching valve 64 via a forward drive pilot circuit 71 connected to the first pilot circuit 36. The forward/backward switching valve 64 is thereby shifted into forward drive mode F. When in the forward drive mode F, the forward/backward switching valve 64 connects the forward drive circuit 26 and the first motor cylinder circuit 66, and connects the forward drive pilot circuit 71 to a pressure detection circuit 73. Hydraulic fluid from the forward drive circuit 26 is thereby supplied to the motor displacement control cylinder 61. The pressure detection circuit 73 is connected to a pilot circuit pressure detector 74 comprising a hydraulic pressure sensor. Thus, the pressure of the forward drive pilot circuit 71 is detected by the pilot circuit pressure detector 74. When the electromagnetic direction control valve 32 is in the backward drive mode R, hydraulic fluid is supplied to a backward drive pilot port 64b of the forward/backward switching valve 64 via a backward drive pilot circuit 72 connected to the second pilot circuit 37. The forward/backward switching valve 64 is thereby shifted into backward drive mode R. When in the backward drive mode R, the forward/backward switching valve 64 connects the backward drive circuit 27 and the first motor cylinder circuit 66, and connects the backward drive pilot circuit 72 to the pressure detection circuit 73. Through this, hydraulic fluid from the backward drive circuit 27 is supplied to the motor displacement control cylinder 61. The pressure of the backward drive pilot circuit 72 is detected by the pilot circuit pressure detector 74. The pilot circuit pressure detector 74 detects the hydraulic pressure of the forward drive pilot circuit 71 or of the backward drive pilot circuit 72, i.e., the main pilot circuit pressure, and sends it as a detection signal to the controller 19.

The pressure of the first motor cylinder circuit 66, i.e., the drive pressure of the higher-pressured drive circuit driving the hydraulic motor 15, is detected by a drive pressure detector 76. The drive pressure detector 76 sends the drive pressure to the controller 19 as a detection signal.

The inching operation part 17 has an inching pedal 81 and an inching valve 82. The inching pedal 81 is provided within the operator cab 5, and is operated by the operator. When the inching pedal 81 is operated, the inching valve 82 connects the main pilot circuit 35 and the drainage circuit 39. The inching valve 82 thereby reduces the main pilot circuit pressure according to the operation amount of the inching pedal 81. The inching operation part 17 is used, for example, when one wishes to increase the rotation rate of the engine 10 but prevent an increase in travelling speed. Specifically, when the rotation rate of the engine 10 is increased by depressing the accelerator pedal 22, the main pilot circuit pressure also increases. Here, by operating the inching pedal 81 and opening the inching valve 82, it is possible to control increase in the main pilot circuit pressure. It is thereby possible to prevent an increase in the displacement of the first hydraulic pump 11, and in the rotational speed of the hydraulic motor 15.

The inching valve 82 is connected to a brake valve 83 via a spring. The brake valve 83 controls the supply of hydraulic fluid to a hydraulic brake device 86. The inching pedal 81 doubles as a member for operating the hydraulic brake device 86. Until the operation amount of the inching pedal 81 reaches a predetermined level, only the inching valve 82 is operated. When the operation amount of the inching pedal 81 reaches the predetermined level, operation of the brake valve 83 commences, and, braking force is thereby generated in the hydraulic brake device 86. When the inching pedal 81 is operated at or above the predetermined level, the braking force of the hydraulic brake device 86 is controlled according to the operation amount of the inching pedal 81.

The forward/backward switching operation part 18 has a forward/backward switch lever 84 as a forward/backward drive switching member and a lever operation detector 85. The forward/backward switch lever 84 is provided within the operator cab 5, and is operated by the operator so as to indicate a switch between forward and backward travelling in the vehicle. The forward/backward switch lever 84 is switched between a forward motion position, a backward motion position, and a neutral position. The lever operation detector 85 detects whether the forward/backward switch lever 84 is in the forward motion position, the backward motion position, or the neutral position, and sends the results to the controller 19 as a detection signal.

There is also provided a traction control operating part 87 within the operator cab 5. The traction control operating part 87 has, for example, a dial-type traction selecting member 89 and a first position detector 91 for detecting the position selected using the traction selecting member 89. The first position detector 91 sends the detected selected position to the controller 19 as a detection signal. The traction selecting member 89 is operated in order to set a maximum traction force in accordance with traction control described below.

The controller 19 is an electronic controller that has a CPU, various types of memory, and other components; and electrically controls the various electromagnetic control valves and the fuel injector device 21 based on output signals from the detectors. The controller 19 thereby controls engine rotation rate, motor displacement, and other parameters. For example, the controller 19 processes detection signals from the engine rotation rate detector 25 and the drive pressure detector 76, and outputs a motor displacement command signal to the pilot pressure control valve 63. Here, the controller 19 sets a command signal based on the engine rotation rate and drive pressure values through load control as described below so as to obtain a motor displacement/drive pressure profile such as that illustrated in FIG. 3, and outputs the signal to the pilot pressure control valve 63. Solid line L21 within FIG. 3 indicates motor displacement relative to drive pressure for a predetermined engine rotation rate value. Up until a predetermined value, drive pressure is at a minimum (Min), and afterwards motor displacement gradually increases along with an increase in the drive pressure (diagonal portion L22 of the solid line). When motor displacement reaches a maximum (Max), motor displacement remains at maximum displacement Max even if pressure climbs further. The diagonal portion L22 of the solid line is set so as to go higher or lower according to engine rotation rate. Specifically, motor displacement is controlled so that if engine rotation rate is low, motor displacement begins increasing at a lower drive pressure, and reaches to maximum motor displacement at a lower drive pressure (see lower dotted diagonal portion L23 in FIG. 3). Conversely, motor displacement is controlled so that if engine rotation rate is high, motor displacement is maintained at minimum motor displacement Min until a higher drive pressure, and motor displacement reaches to maximum motor displacement at a higher drive pressure (see upper dotted diagonal portion L24 in FIG. 3). The traction force and vehicle speed of the construction vehicle 1 thereby change along a continuous range, and it is possible to automatically change speed from a vehicle speed of zero up to maximum vehicle speed without making a gear shifting operation (see line L1 in FIG. 4).

For instance, when forward drive is selected using the forward/reverse switching lever 84, hydraulic fluid discharged from the charge pump 13 is supplied to the first pilot circuit 36 via the charge circuit 42, the engine sensing valve 43, the main pilot circuit 35, and the electromagnetic direction control valve 32. The piston 34 of the pump displacement control cylinder 31 is moved by the hydraulic fluid from the first pilot circuit 36 in the leftward direction in FIG. 2, and changes the swashplate angle of the first hydraulic pump 11. Here, the swashplate angle of the first hydraulic pump 11 is changed in a direction such that displacement towards the forward drive circuit 26 increases. In this state, the second pilot circuit 37 is connected to the drainage circuit 39 by the electromagnetic direction control valve 32.

The hydraulic fluid from first pilot circuit 36 is supplied to the forward drive pilot port 64a of the forward/reverse switching valve 64 via the forward drive pilot circuit 71. The forward/reverse switching valve 64 is thereby shifted into the forward drive state F. In this state, the forward drive circuit 26 and the first motor cylinder circuit 66 are connected, and hydraulic fluid from the forward drive circuit 26 is supplied to the motor displacement control cylinder 61. The pressure level of the forward drive circuit 26 is detected by the drive pressure detector 76 and sent as a detection signal to the controller 19. When the forward/reverse switching valve 64 is in the forward drive state F, the forward drive pilot circuit 71 and the pressure detection circuit 73 are connected, and the pressure level of the forward drive pilot circuit 71 is detected by the pilot circuit hydraulic pressure detector 74. The pilot circuit hydraulic pressure detector 74 sends the detected pressure level of the forward drive pilot circuit 71 to the controller 19 as a detection signal. As described above, the controller 19 calculates the current value of a command signal based on the engine rotation rate and the drive pressure, i.e., the hydraulic pressure within the forward drive circuit 26 (see FIG. 5). The controller 19 then sends a command signal having the calculated current value to the pilot pressure control valve 63. The pilot pressure control valve 63 controls the pressure of the hydraulic fluid supplied to the pilot port 62a of the motor displacement control valve 62 based on the command signal from the controller 19. The motor displacement control valve 62 is thereby controlled, and the position of the piston 65 of the motor displacement control cylinder 61 is adjusted. As a result, the angle of the inclined shaft is adjusted so that the actual motor displacement becomes a commanded displacement corresponding to the command signal.

Traction Control

Figure 3:
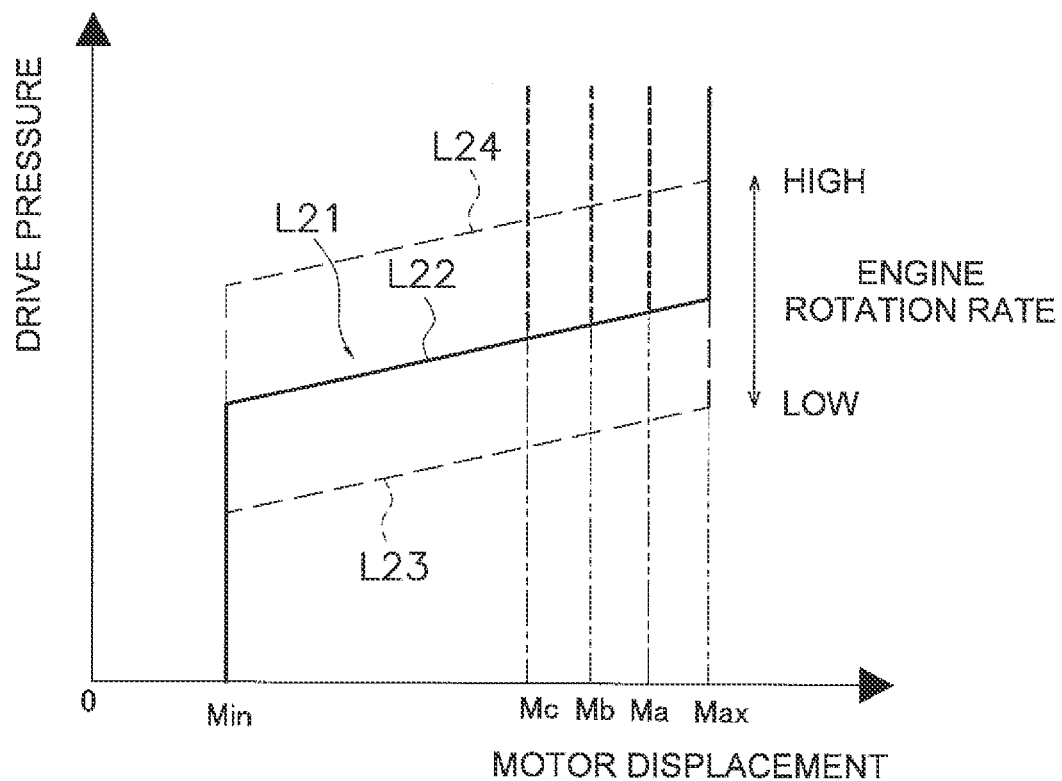
FIG. 3 illustrates an example of a motor displacement/drive pressure profile.
Figure 4:
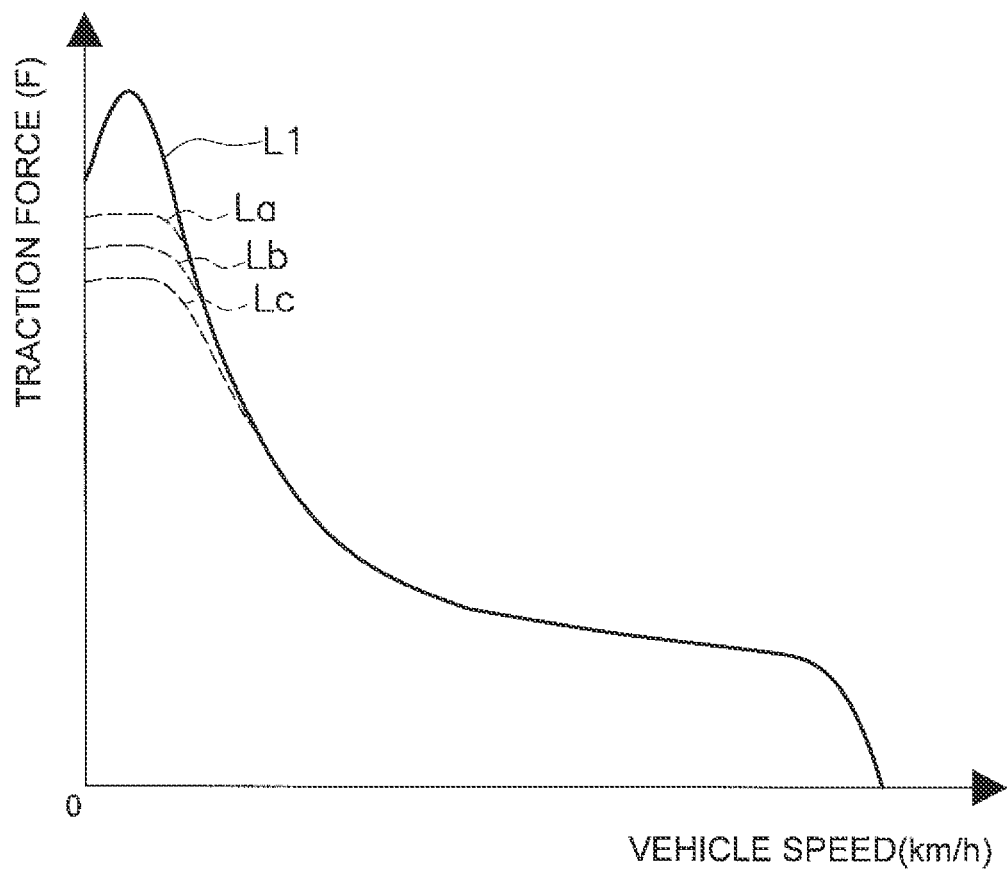
FIG. 4 illustrates a vehicle speed/traction force profile.

The controller 19 performs traction control through the traction selecting member 89 being operated. The traction control refers to changing the maximum traction force of the vehicle amongst a plurality of levels by changing the maximum displacement of the hydraulic motor 15. The controller 19 reduces the maximum displacement of the hydraulic motor 15 in a plurality of levels according to the operation of the traction selecting member 89. Specifically, the controller 19 outputs a command signal to the pilot pressure control valve 63 so that maximum displacement is changed from Max to one of Ma, Mb, or Mc, as illustrated in FIG. 3. When the maximum displacement is changed to Ma, the vehicle speed/traction force profile changes as shown by line La in FIG. 4. Maximum traction force is thus reduced compared to line L1, which shows the vehicle speed/traction force profile when the traction control is not being performed. When the maximum displacement is changed to Mb, the vehicle speed/traction force profile changes as shown by line Lb, and the maximum traction force decreases further. When the maximum displacement is changed to Mc, the vehicle speed/traction force profile changes as shown by line Lc, and the maximum traction force decreases even further.

Load Control

There shall now be described a process of load control performed by the controller 19 in order to set the command signal described above. Load control refers to feedback control of the motor displacement control part 16 so that the drive pressure detected by the drive pressure detector 76 approaches a predetermined target drive pressure.

Figure 5:
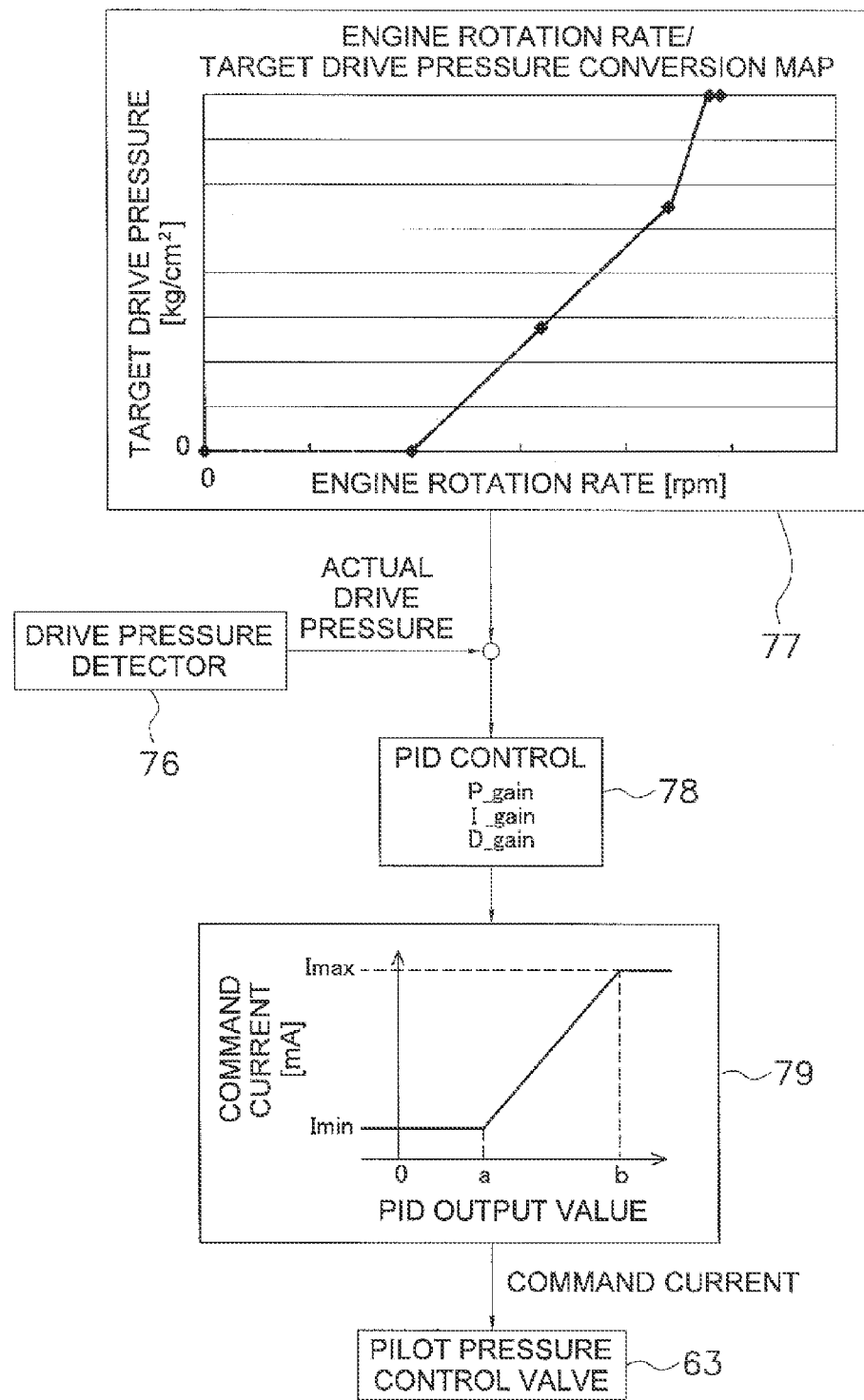
FIG. 5 is a function block chart of load control by the controller.

As illustrated in FIG. 5, the controller 19 has a target drive pressure calculating part 77, a PID controller 78, and a command current calculating part 79. The target drive pressure calculating part 77 calculates a target drive pressure based on the engine rotation rate detected by the engine rotation rate detector 25. Specifically, the target drive pressure calculating part 77 stores an engine rotation rate/target drive pressure conversion map like that illustrated in FIG. 5, and calculates target drive pressure from this conversion map.

The PID controller 78 performs PID control using as an output value the command current input into the pilot pressure control valve 63 with the target drive pressure calculated by the target drive pressure calculating part 77 and the actual drive pressure detected by the drive pressure detector 76 as input values. The PID controller 78 calculates the output value based on the formula below.

(output value)=(−1)×((P_gain×deviation)+(I_gain× cumulative deviation)+(D_gain×(current deviation−previous deviation))

The PID controller 78 uses preset constants for three gains P, I, and D (P_gain, I_gain, D_gain).

As illustrated in FIG. 5, the command current calculating part 79 limits the output value from the PID controller 78 to a range between a predetermined maximum value Imax and minimum value Imin. For example, when the traction control is performed, the minimum value Imin is set to a value corresponding to the maximum displacement set by the traction control. The command current is lower in correspondence with a higher motor displacement. A command signal having the command current calculated by the command current calculating part 79 is then input to the pilot pressure control valve 63. The motor displacement control part 16 is thereby controlled so that the drive pressure detected by the drive pressure detector 76 approaches the predetermined target drive pressure.

Inching Control

Figure 6:
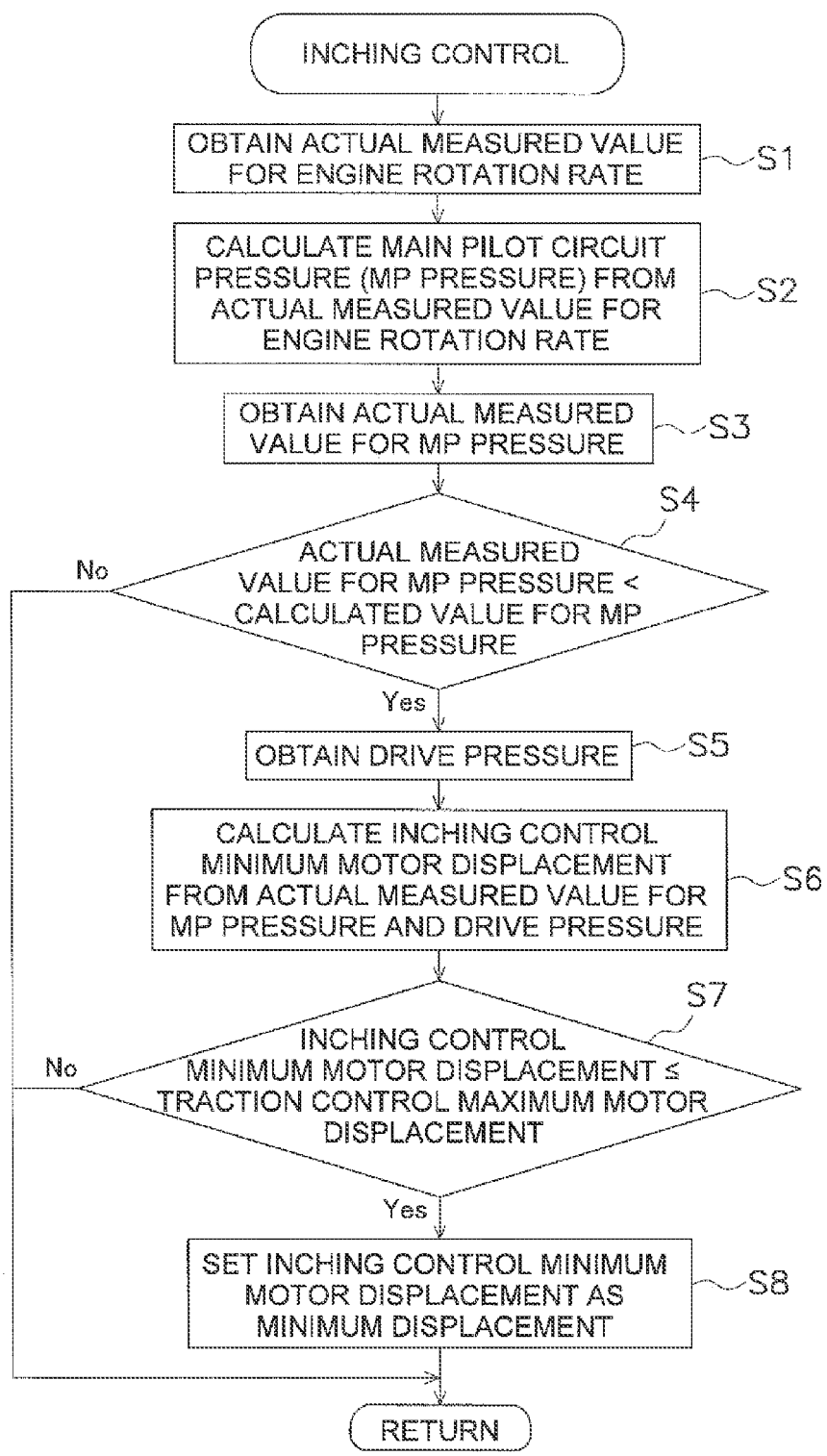
FIG. 6 is a flow chart of inching control.

As described above, the work vehicle 1 is provided with the inching operation part 17, and main pilot circuit pressure is reduced through the operation of the inching pedal 81. The displacement of the first hydraulic pump 11 thereby decreases, and braking force can be generated. When the inching pedal 81 is operated, the controller 19 performs inching control that sets the minimum displacement of the hydraulic motor 15 at a greater value the less the main pilot circuit pressure. The inching control will be described below with reference to the flowchart in FIG. 6.

In step S1, an actual measured value for engine rotation rate is obtained. Here, the actual measured value for engine rotation rate is obtained based on the detection signal from the engine rotation rate detector 25.

Figure 7:
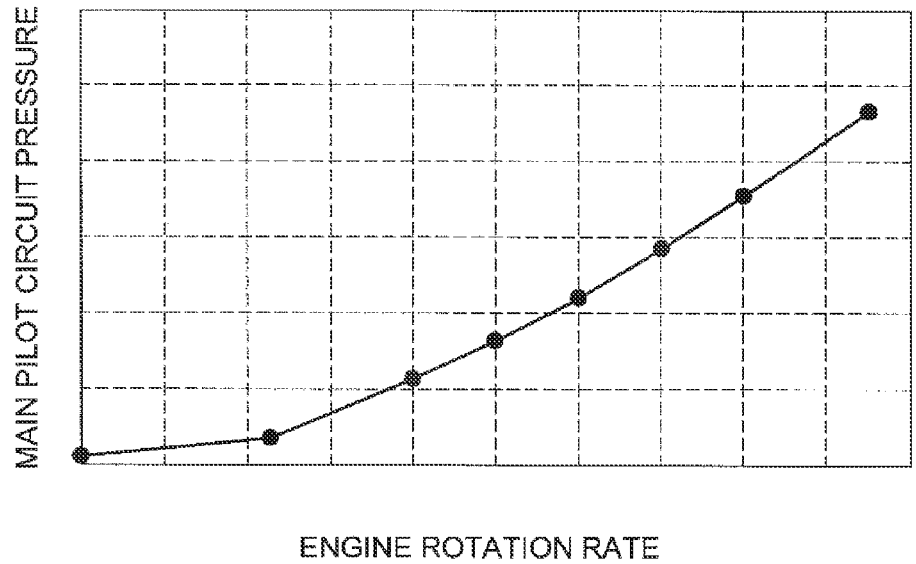
FIG. 7 illustrates one example of an engine rotation rate/ main pilot circuit pressure profile map.

In step S2, main pilot circuit pressure is calculated from the actual measured engine rotation rate value. Here, the main pilot circuit pressure is calculated based on the actual measured engine rotation rate value obtained in step S1 and the engine rotation rate/main pilot circuit pressure profile map shown in FIG. 7. Specifically, the main pilot circuit pressure corresponding to the actual engine rotation rate detected by the engine rotation rate detector 25 is calculated. The engine rotation rate/main pilot circuit pressure profile map is a map illustrating the relationship between engine rotation rate and main pilot circuit pressure, and is obtained in advance via experimentation or simulation and stored into the controller 19.

In step S3, an actual measured value for main pilot circuit pressure (MP pressure) is obtained. Here, the main pilot circuit pressure is obtained based on the detection signal from the pilot circuit hydraulic pressure detector 74.

In step S4, it is determined whether or not the actual measured value for the main pilot circuit pressure is less than the calculated main pilot circuit pressure value. Here, it is determined whether or not the actual main pilot circuit pressure detected by the pilot circuit hydraulic pressure detector 74 is less than the main pilot circuit pressure value calculated in step S2. If the actual measured value for main pilot circuit pressure is less than the value calculated for main pilot circuit pressure, it is determined that the inching pedal 81 is being operated, and the procedure continues to step S5.

In step S5, drive pressure is obtained. Here, drive pressure is obtained based on the detection signal from the drive pressure detector 76.

Figure 8:
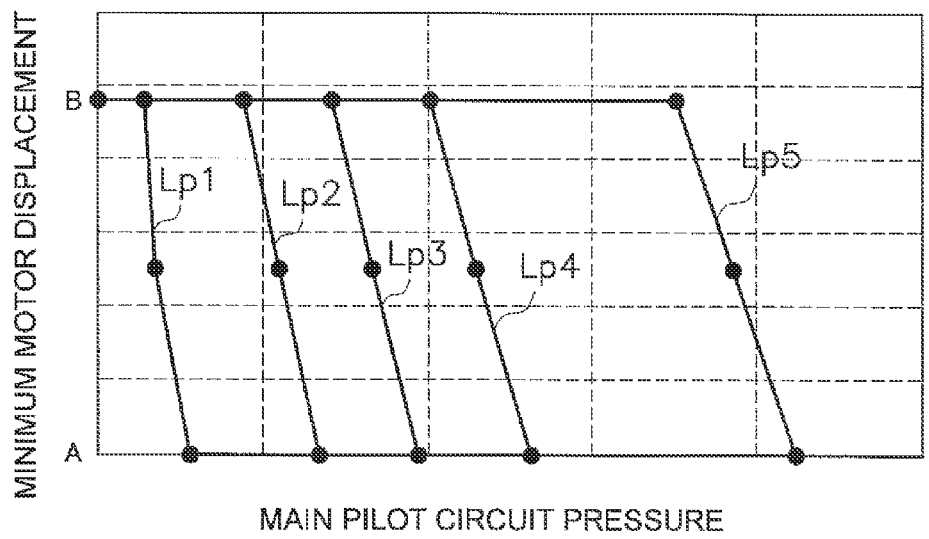
FIG. 8 illustrates one example of a main pilot circuit pressure/inching control minimum motor displacement map.

In step S6, inching control minimum motor displacement is calculated from the actual measured value for main pilot circuit pressure and the drive pressure. Here, the main pilot circuit pressure/inching control minimum motor displacement map illustrated in FIG. 8 is used to calculate inching control minimum motor displacement from the actual measured value for main pilot circuit pressure and the drive pressure. In FIG. 8, lines Lp1 to Lp5 indicate changes in the relationship between main pilot circuit pressure and inching control minimum motor displacement according to drive pressure. Lines Lp1 to Lp5 illustrate increasing levels of drive pressure, with drive pressure being lowest in line Lp1 and highest in line Lp5. As can be seen from this map, the smaller the main pilot circuit pressure, the larger the value calculated for inching control minimum motor displacement. In FIG. 8, inching control minimum motor displacement becomes a constant lower limit value A when the main pilot circuit pressure is at or above a predetermined value. Inching control minimum motor displacement becomes a constant upper limit value B when main pilot circuit pressure is at or below a predetermined value. The lower limit value A is equal to minimum displacement during normal control (i.e. the load control), when the inching control is not being performed. The upper limit value B is a value that is greater than the minimum displacement during the normal control when the inching control is not being performed, and less than maximum displacement during the normal control.

Next, in step S7, it is determined whether inching control minimum motor displacement is equal to or less than traction control maximum motor displacement. Here, it is determined whether the inching control minimum motor displacement calculated in step S6 is equal to or less than the maximum motor displacement that was reduced during the traction control (see Ma through Mc in FIG. 3). When inching control minimum motor displacement is equal to or less than the traction control maximum motor displacement, the procedure continues to step S8.

In step S8, inching control minimum motor displacement is set as the minimum displacement of the hydraulic motor 15. Here, motor displacement control is performed with the inching control minimum motor displacement calculated in step S6 as the minimum displacement of the hydraulic motor 15. Thus, when the motor displacement set by the load control as described above is greater than the inching control minimum motor displacement set during step S8, the command current calculated by the load control is input to the pilot pressure control valve 63. However, when the motor displacement calculated and set during the load control is smaller than the inching control minimum motor displacement, a command current corresponding to the inching control minimum motor displacement is input to the pilot pressure control valve 63.

Figure 9:
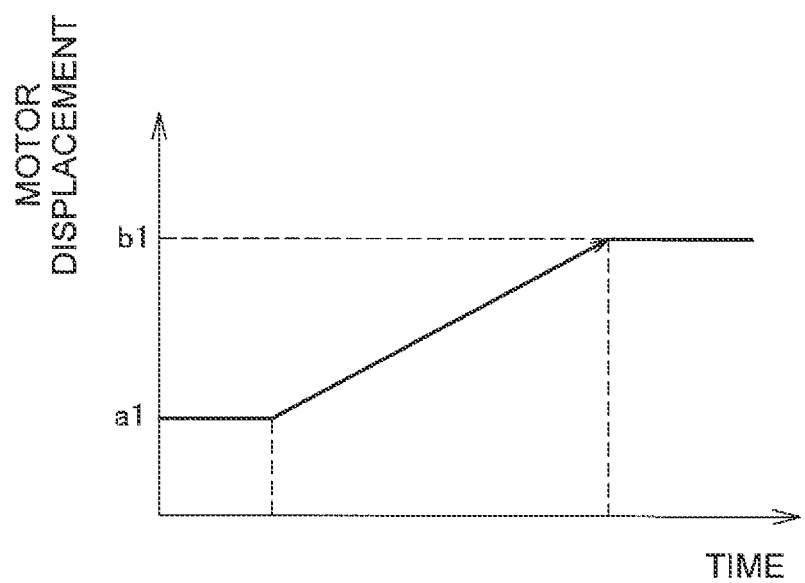
FIG. 9 is an illustration showing modulation of a command current to a pilot pressure control valve.

When the inching control is performed, the command current is changed from a value corresponding to the motor displacement calculated during the load control immediately before the inching control is performed to a value corresponding to the inching control minimum motor displacement. At this time, as illustrated in FIG. 9, the controller 19 modulates and outputs the command current so that motor displacement gradually increases from a motor displacement a1 before the inching control is performed to a motor displacement b1 after the inching control is performed. FIG. 9 illustrates modulation of the command current when motor displacement increases. When there is a reduction in motor displacement between motor displacement during the inching control and motor displacement after the inching control is complete, the command current is likewise modulated and output so that motor displacement gradually decreases.

If the actual measured value for main pilot circuit pressure from step S4 is equal to or greater than the calculated value for main pilot circuit pressure, the inching control is not performed. Specifically, inching control minimum motor displacement is not set as the minimum displacement of the hydraulic motor 15. In step S7, if inching control minimum motor displacement is greater than traction control maximum motor displacement, the inching control is also not performed.

In this work vehicle 1, when the inching pedal 81 is operated, the main pilot circuit pressure supplied to the pump displacement control part 30 is reduced. The displacement of the first hydraulic pump 11 is thereby reduced. When the inching pedal 81 is being operated, the inching control is performed as described above. The minimum displacement of the hydraulic motor 15 is thereby set to a greater value in correspondence with a lower main pilot circuit pressure. Thus, the minimum displacement of the hydraulic motor 15 is set to a higher value in correspondence to the inching pedal 81 being operated by a greater amount. The braking force of the HST brake thereby increases. It is thus possible to generate a greater braking force than the braking force generated when only the displacement of the first hydraulic pump 11 is reduced.

A decision as to whether or not the inching pedal 81 is being operated or not is made by comparing the actual measured value for main pilot circuit pressure and the value calculated for main pilot circuit pressure relative to the engine rotation rate. It is thereby possible for the controller 19 to precisely detect that the inching pedal 81 is being operated.

In this work vehicle 1, when the inching control minimum motor displacement is greater than the traction control maximum motor displacement, the inching control is not performed. It is thereby possible to prevent the minimum displacement from being set to a higher value than the maximum displacement.

In this work vehicle 1, by modulating the command current as described above, it is possible to prevent abrupt changes in the displacement of the hydraulic motor 15 when the inching control is begun and ended. It is thereby possible to prevent shocks from being generated in the vehicle.

Also, in this work vehicle 1, when the inching pedal 81 is operated to or above a predetermined amount, braking by the hydraulic brake device 86 commences. The braking force generated by the reduction in the displacement of the first hydraulic pump 11 is much smaller than the braking force generated by the hydraulic brake device 86. For this reason, when only a reduction in hydraulic pump displacement is performed during inching operation as in conventional work vehicles, shock is generated in the vehicle due to the difference in braking force. Specifically, because there is a large difference between the braking force generated only by the first hydraulic pump 11 before the inching pedal 81 is operated by the predetermined amount and the braking force generated by the hydraulic brake device 86 when the inching pedal 81 is operated by the predetermined amount, there is a large change in braking force and shock is generated. However, in this work vehicle 1, when the inching pedal 81 is operated, an HST brake activated by the hydraulic motor 15 is also used along with a reduction in the displacement of the first hydraulic pump 11, as described above. A large braking force is thereby generated, and the generation of shock such as has been described above can be prevented.

Other Embodiments (a) In the embodiment described above, the present invention is adopted for use in a wheel loader, but it may also be adopted for use in other kinds of work vehicles.

(b) The method used by the controller 19 to calculate the various parameters is not limited to a map; it may also be a table or a formula.

(c) The method used to determine whether the inching pedal 81 is being operated is not limited to that of the embodiment described above. For instance, it is possible to provide a position detector for detecting the position of the inching pedal 81, with the determination being based on a detection signal from this position detector.

(d) In the embodiment described above, a dial-type member was used as the traction selecting member 89, but another operating member such as a slide-type switch or lever may also be employed. Also, the maximum traction levels selectable during traction control are not limited to those described above. Furthermore, the maximum traction force can be continuously variable according to the amount by which the traction selecting member 89 is operated.

The present invention has the effect of enabling a large braking force to be generated via inching operation, and is useful as a work vehicle.

The invention claimed is:

1. A work vehicle comprising:
   an engine;
   a hydraulic pump that is a variable displacement hydraulic pump, the hydraulic pump driven by the engine;
   a pump displacement control part configured to control displacement of the hydraulic pump according to a supplied pilot pressure;
   a pilot pressure supply part configured to supply pilot pressure to the pump displacement control part according to rotation rate of the engine;
   a hydraulic motor that is a variable displacement hydraulic motor, the hydraulic motor driven by hydraulic fluid discharged by the hydraulic pump;
   a drive wheel driven by the hydraulic motor;
   a motor displacement control part configured to control displacement of the hydraulic motor;
   an inching operation member configured to be operated for reducing the pilot pressure supplied to the pump displacement control part;
   a pilot pressure detector configured to detect the pilot pressure supplied to the pump displacement control part; and
   a controller configured to control the displacement of the hydraulic motor by electronically controlling the motor displacement control part, and, when the inching operation member is being operated, to perform inching control so that minimum displacement of the hydraulic motor is set to a greater value in correspondence with a lower pilot pressure detected by the pilot pressure detector.

2. The work vehicle according to claim 1, further comprising
   an engine rotation rate detector configured to detect the engine rotation rate, wherein
   the controller is configured to calculate the pilot pressure corresponding to the engine rotation rate detected by the engine rotation rate detector, and to determine that the inching operation member is being operated when the pilot pressure detected by the pilot pressure detector is smaller than the calculated pilot pressure.

3. The work vehicle according to claim 1, wherein
   the controller is configured to perform traction control for reducing vehicle traction force by reducing maximum displacement of the hydraulic motor, and not to perform the inching control when the minimum displacement of the hydraulic motor during the inching control is greater than the maximum displacement of the hydraulic motor during the traction control.

4. The work vehicle according to claim 1, wherein
   the controller is configured to control the motor displacement control part so as to gradually change the displacement of the hydraulic motor when the displacement of the hydraulic motor is changed upon the start or end of the inching control.

* * * * *